United States Patent Office 3,671,133
Patented June 20, 1972

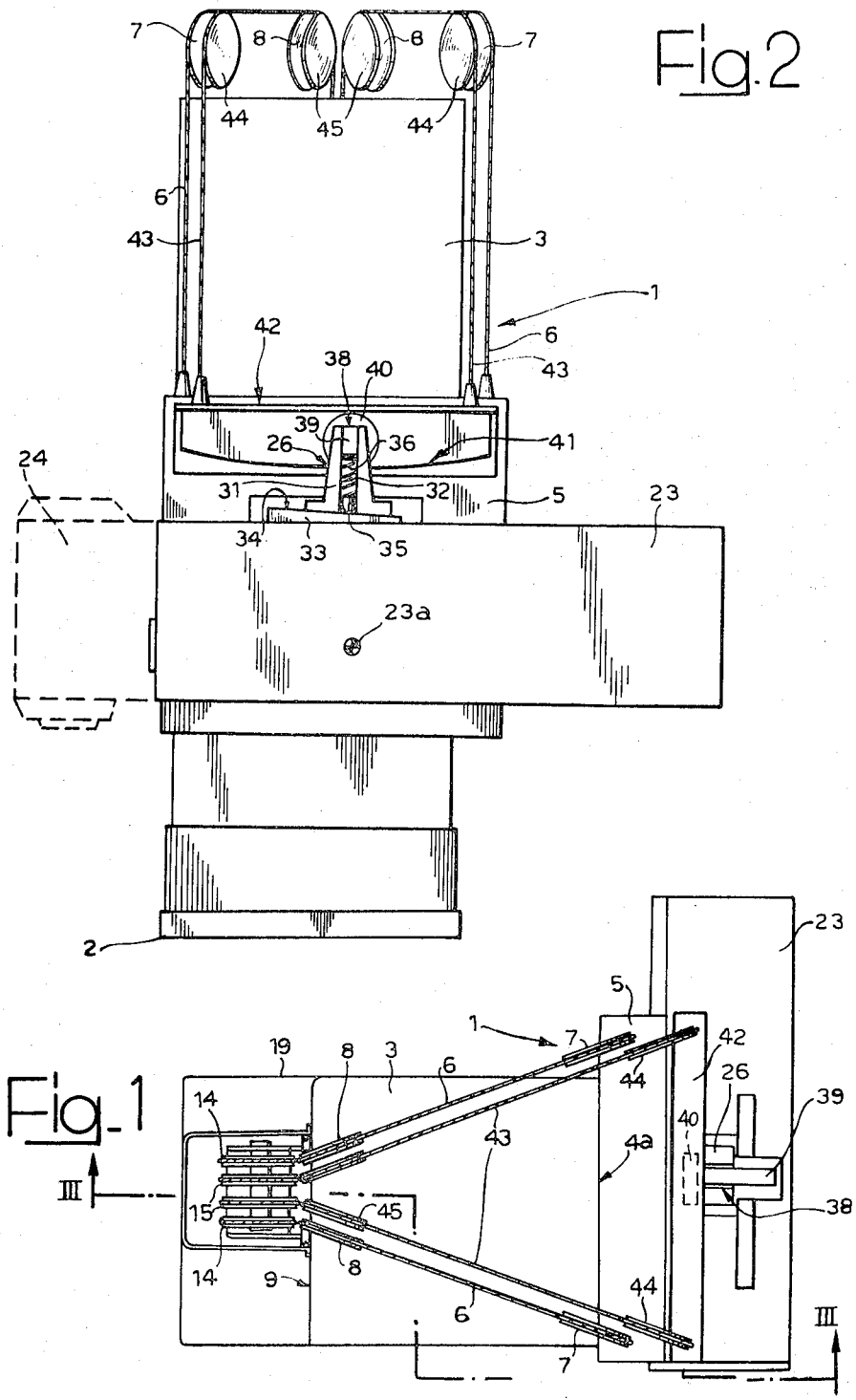

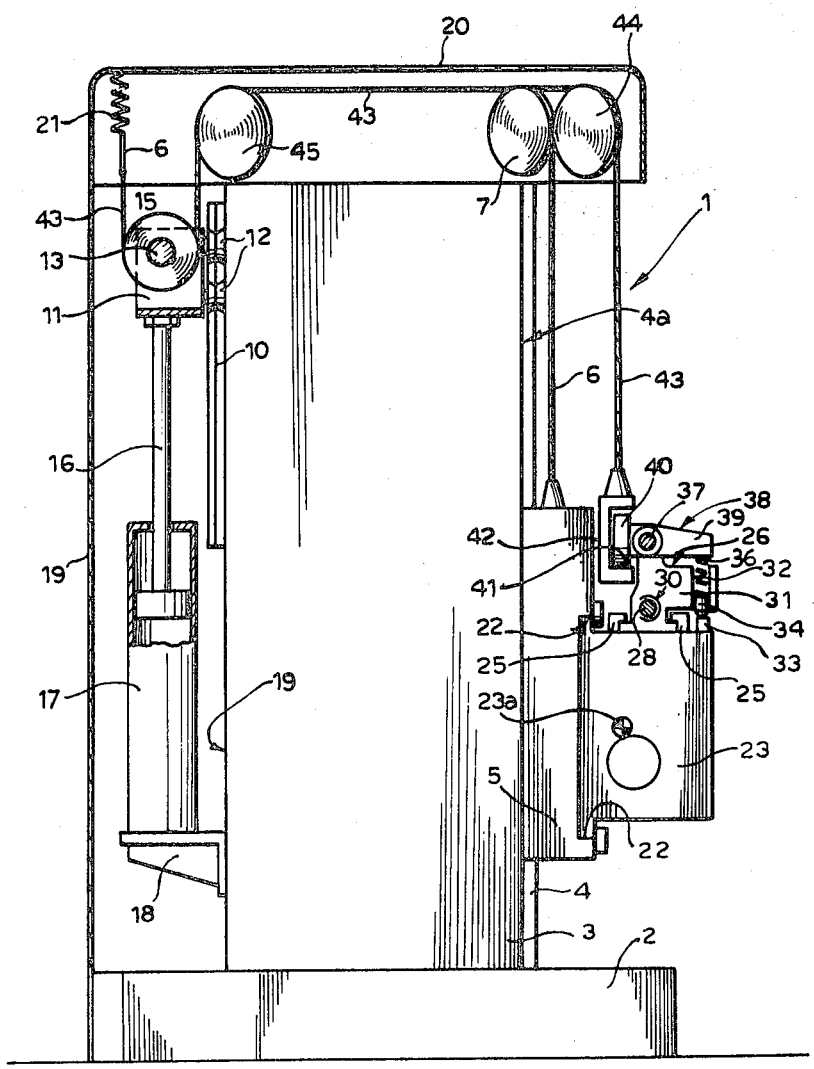

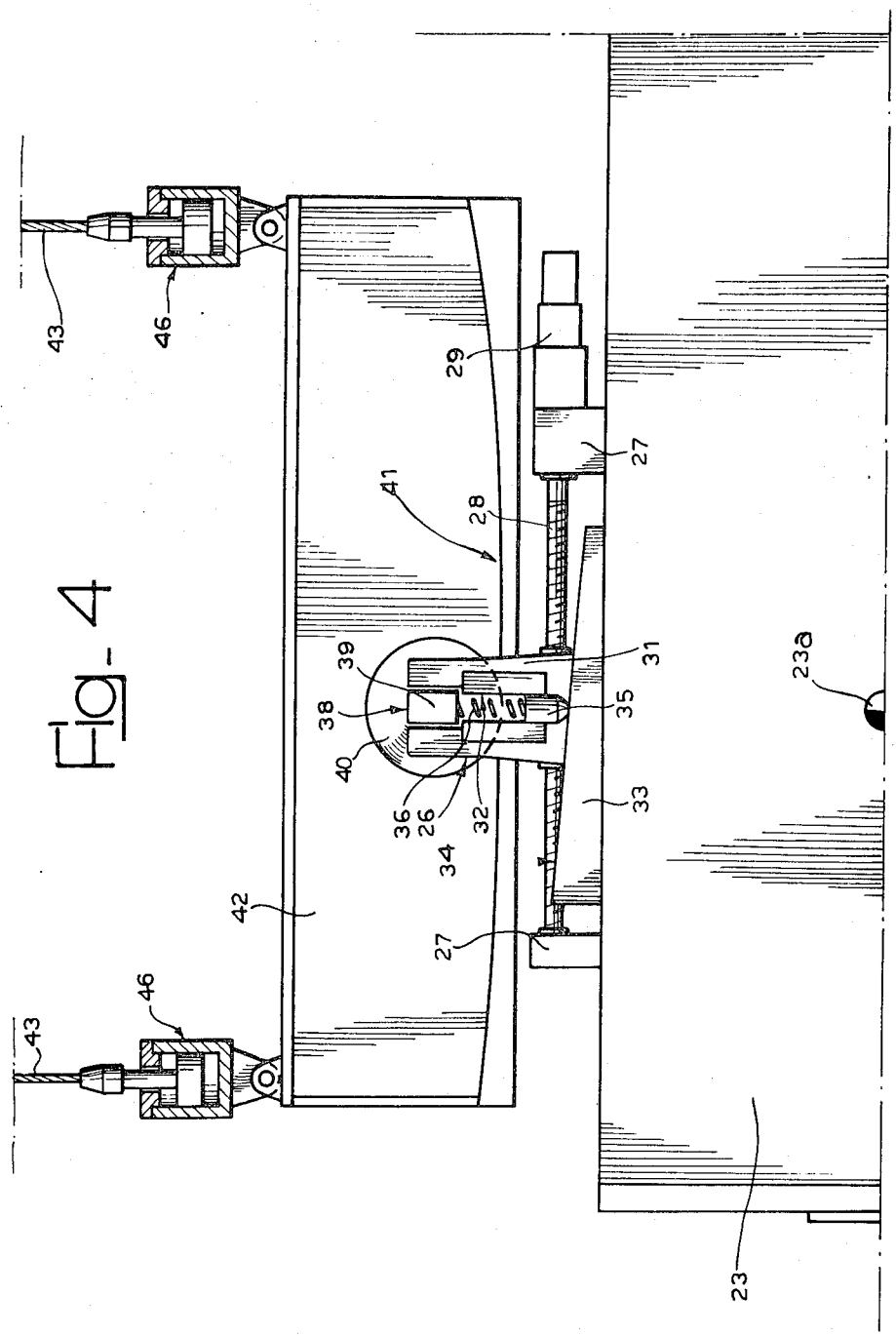

3,671,133
BALANCE COMPENSATED MACHINE TOOLS
Maso Galbarini, Pavia, and Francesco Cotta Ramusino, Milan, Italy, assignors to Innocenti Societa Generale per l'Industria Metallurgica e Meccanica, Milan, Italy
Filed Nov. 2, 1970, Ser. No. 86,050
Claims priority, application Italy, May 22, 1970, 68,759/70
Int. Cl. B23b 47/26
U.S. Cl. 408—235                                    13 Claims

ABSTRACT OF THE DISCLOSURE

A large machine tool having a bed, and an upright extending above the bed, the upright carrying vertical guideways for a slide which carries horizontal guideways for a workhead. The workhead is adapted to carry a range of different attachments. In order to relieve the guideways, as far as possible, from the weight of the slide, the workhead and its attachments, the slide is suspended, by a pulley system, from the top of the upright; a counterbalancing hydraulic actuator being provided on the far side of the upright; the workhead is mounted on an intermediate member which is suspended in the same way as the slide. The intermediate member carries a track along which the workhead can slide; the track is curved in a vertical plane to compensate for the extension of the cables as the workhead moves along the horizontal guideways of the slide. A cam and follower arrangement is provided to compensate for the shift in the centre of gravity as different attachments are connected to the workhead.

---

The present invention relates to machine tools, and particularly to milling and boring machine tools which have a movable work head.

Machines with a movable work head typically comprise a machine bed, an upright carrying substantially vertical guideways extending above the bed, a slide vertically movable upon the guideways of the upright, means for supporting the slide, which means are designed to transfer the weight of the slide onto the upright, a work head horizontally movable upon guideways carried by the slide, the work head being adapted to carry any attachments that may be required supported directly by the slide.

In large and medium size machine tools it is necessary to relieve, as far as possible, the guideways from the forces and from the moments generated by the weight and by the movement of the movable members, so as to increase geometric accuracy and regularity of movement, and also to reduce the power necessary to control this movement.

In large milling and boring machines with a movable work head this necessity takes on a special importance in view of the great weight of the work head and the relatively great extent to which the work head projects in its movement. As stated above, the work head is slidable along substantially horizontal guideways mounted on a slide which in its turn is slidable along substantially vertical guideways borne by a substantially upright member.

Both of these sets of guideways have to be relieved as much as possible from the forces and moments produced by the weight of the work head and the slide in all the positions which the work head may assume with respect to the slide. Moreover, the work head is adapted to carry a range of different heavy attachments which considerably vary the position of the centre of gravity of the work head, and hence also the forces and moments passed on by it. Similarly the weight of the combined work head and attachment assembly may vary quite considerably depending on the particular attachment in use.

To achieve the desired degree of accuracy it is necessary that, whatever the position of the head upon the slide, and with attachments of any weight, the guides of the upright shall be relieved of the greater part of the moments generated by the movement of the assembly and the guides of the slide shall be relieved of the greater part of the weight and of the moments so generated. It is moreover necessary to ensure that the head, in every position it may assume upon the slide, shall be correctly adjusted and shall have a substantially rectilinear path.

There are already known prior art machines of this type in which the upright has, on top, a number of pulleys over which pass cables connected at one end to the upper face of the work head, and at the other end, to counterweights designed to compensate exactly the weight of the said head. These supporting cables which suspend the work head are attached so as to act along a vertical barycentric axis whatever may be the position of the work head upon the slide. To achieve this the pulley system which suspends the cables is mounted on a vertical shaft which is placed within the upright, and which is rotatable about its own axis. This system is an attempt to keep the overall barycentric position of the machine fixed by means of mechanical counterweights which are movable in synchronism with the work heads. Machines of this type have, however, the disadvantage of not permitting exact balancing of the work head when attachments which vary the position of its centre of gravity are attached thereto.

Another disadvantage of the machine tools of the type described above is that with the suspension system of the head rotating around a central axis, during a rectilinear traverse of the work head, the path followed by the point of suspension of the work head traces a trajectory such that the suspension point of the head is not always located in the vertical barycentric line of the work head. Finally, in machines of the type described above, it is possible to make use only of mechanical counterweights; these automatically double the translating masses. This fact causes considerable difficulties if the machine tool is to be driven by means of numerical control.

In other known milling and boring machine tools there are attached to the top of the upright two pulley systems designed to support two cable or chain systems connected at one end to respectively the slide and the work head, and at the other end to mechanical counterweights or to mechanical or hydraulic actuators designed to balance the weight and the moments of the slide and the head respectively. In particular, the two supporting cables or chains of the work head have two rollers at the ends connected to the head. The rollers run on a track formed in an undercut on the head. The track is divided into two parts, one for each roller and formed in such a fashion as to compensate, at every relative position of the head and the slide for the resilience of the two cables connected to the rollers.

In machines of this type the head is suspended at two distinct points the position of which with respect to the head varies according to the position of the head. Consequently the forces which the rollers pass on to the work head depend on the position of the work head. The work head therefore distorts differently according to its position, thus not allowing exact machining. Moreover, in machines of this type it is not possible to achieve the necessary compensation for the situation where a range of different attachments of differing weights are to be connected to the head.

There are also known machines in which the slide is suspended at the top of the upright by means of cables passing over pulleys and connected at their far ends to mechanical counterweights or to mechanical or hydraulic actuators. In these machines the head is suspended on the slide by means of a roller which can be moved along the head so as to follow the change in position of the centre of gravity when attachments are connected to the work head. In this way it is possible to balance the work head both from the point of view of weight and from the point of view of moments. The suspending roller of the head, however, rolls along a track formed on the slide which supports the work head, and this gives rise to considerable moments in the slide due to the movement of the head and to the addition of attachments.

According to the present invention there is provided a machine tool of the kind having a bed, an upstanding member having substantially vertical guideways extending above the bed, a slide constrained to move along the said guideways, load transfer means connected to the upstanding member and supporting the weight of the slide, and a work head constrained to move along substantially horizontal guideways on the slide, and adapted to support a range of different attachments, characterised in that the work head is supported by a roller which is arranged to roll along an intermediate member suspended from the upstanding member by further load transfer means, the intermediate member bearing a track for the roller which track is shaped to compensate for the resilience of the load transfer means so that the roller and the working head move along a line which is substantially horizontal and rectilinear.

One embodiment of the present invention will now be described, by way of example, with reference to the accompanying drawings in which:

FIG. 1 is a diagrammatic plan view of one embodiment of a machine tool constructed in accordance with this invention;

FIG. 2 is a side elevation of the embodiment illustrated in FIG. 1;

FIG. 3 is a section along the line III—III of FIG. 1; and

FIG. 4 is an enlarged detail of FIG. 2.

In the illustrations, the whole machine tool is generally indicated by the numeral 1. The machine tool 1 comprises a bed 2 upon which rests an upstanding member in the form of an upright 3. The upright 3 is substantially rectangular in cross section and has on one of its faces 4a vertical guideways 4 on which there is mounted a slide 5.

To the upper surface of the slide 5 there is connected the ends of two cables 6 both lying on a barycentric vertical plane of the slide 5. On the top of the upright 3 there are two pulleys 7 at an angle to one other and placed near to top corners of the face 4a. A second pair of pulleys 8 are placed on the top of the upright 3 next to the face 9 opposite the face 4a. The pulleys 8 are each parallel to a respective one of the pulleys 7, and is placed in line therewith. On the upper portion of the face 9 of the upright 3 there are placed vertical guideways 10 which guide a carriage 11 which is mounted upon the guideways 10 by means of a number of lateral rollers 12. The carriage 11 supports a shaft 13 transverse and perpendicular to the guides 10 upon which shaft 13 are mounted two pairs of pulleys marked 14 and 15 respectively, the pulleys 14 being placed outside the pulleys 15.

To the lower end of the carriage 11 there is connected a balancing member which may consist either of a mechanical counterweight or (as shown in FIG. 3) of an hydraulic or pneumatic actuator 17. As illustrated in FIG. 3, the carriage 11 is connected to the upper end of a rod 16 of a hydraulic actuator 17 placed vertically and supported below by a bracket 18 connected to the surface 9 of the upright 3. The upright 3 is enclosed by a casing 19 which supports above a cover 20 over the pulleys 7 and 8.

The cables 6 pass over the pulleys 7 and 8, and then down the side 9 of the upright 3 passing under the pulleys 14 and finally going up again to have their upper end secured to springs 21 which are in turn secured to the cover 20.

Upon the outer surface of the slide 5 (that is the surface opposite to that cooperating with the guideways 4 on the surface 4a of the upright 3) there are formed horizontal guideways 22 between which there is slidingly assembled a work head 23 which is substantially rectangular in cross section. The work head 23 is adapted so that attachments 24 (as shown in broken outline in FIG. 2) can be connected to the front face thereof.

The work head 23 and any attachments 24 connected to it make up an assembly of which the centre of gravity is shown at 23a in FIGS. 2, 3 and 4.

On the upper face of the work head 23 there are two longitudinal guideways 25, each shaped like an inverted L, and placed facing each other. These guideways 25 are designed to receive the bed of a support member 26. At each end of the guideways 25 there is an upstanding lug 27 having a horizontal aperture therethrough for rotatably supporting the ends of a horizontal screw 28 which is parallel to the longitudinal axis of the work head 23. The screw 28 may be manually operated from one end by a handle (not illustrated) or else it may be connected, (as illustrated in FIG. 4) to a reduction gearbox 29 supported directly by one of the lugs 27. The screw 28 passes through a threaded aperture 30 which traverses the support member 26.

The support member 26 has, on the side remote from the upright 3, a horizontal extension 31 which has a vertical aperture 32 within which there is located a tracer point 35 which is free to slide within the aperture 32. The lower end of the tracer point 35 bears on a cam 33 attached to the upper face of the work head 23. The upper face 34 of the cam 33 is in the general shape of a ramp designed to cooperate with the tracer point 35. The tracer point 35 is biased toward the cam 33 by a spring 36 on the inside of the aperture 32. The upper end of the casing 26 is fork shaped and is adapted to receive a pivot pin 37 which is horizontal and parallel to the longitudinal axis of the work head 23. The pivot pin 37 acts as a fulcrum for a lever 38 perpendicular to the longitudinal axis of the work head 23. The lever 38 comprises an outwardly extending arm 39 the lower surface of which cooperates with the upper end of the spring 36. On the other side of the fulcrum 37 from the arm 39, the lever 38 supports a roller 40 in a vertical plane parallel to the longitudinal axis of the work head 23; this plane passes through the centre of gravity of the work head 23. The roller 40 is designed to slide upon a track 41 formed on an intermediate member 42. The intermediate member 42 has a cross section which is roughly in the shape of a C. The track 41 is formed on the upper face of the lower limb of the C and is curved upwardly at each end to form roughly the shape of a segment of a parabola of the fourth order. The track 41 runs substantially parallel to the longitudinal axis of the work head 23. To the upper surface of the upper limb of the intermediate member 42 there is connected the end of two cables 43 parallel to each other, which rise vertically above the intermediate member 42 and lie in a vertical barycentric plane parallel to the longitudinal axis of the work head 23. The cables 43 are supported by a pair of pulleys 44, placed in a position adjacent and parallel to the pulleys 7 and by a second pair of pulleys 45 placed parallel to the pulleys 8. The cables 43, after having passed over the pulleys 45 travel down to and pass under the pulleys 15 described above and are connected, at their far ends to the cover 20 supported by the casing 19. The intermediate member 42 can be connected directly to the cables 43, or else, as illustrated in FIG. 4, the cables 43 can be coupled to hydraulic cylinders 46 which are highely connected at their lower ends to the intermediate member 42. The machine tool operates as follows.

The slide 5, suspended on the cables 6, is thus free to slide vertically on the guides 4, transferring the whole of its weight by means of the pulleys 7 and 8 on the upright 3. The cables 6 are kept always under the same tension by means of the springs 21 which anchor the cables 6 to the cover 20 so as to be able accurately to support the weight of the slide 5. The work head 23 transfers its weight by means of the roller 40 on to the intermediate member 32, which in turn transfers its weight and the weight of the head 23 on to the upright 3 by means of the cables 43 over the pulleys 44 and 45.

If the intermediate member 42 were integral with the slide 5, the forces passed on by the roller 40 to the intermediate member 42 would generate torque forces which would stress the guides 4 upon which the slide 5 runs. Suspension of the work head 23 by means of the roller 40 also prevents these torque forces from stressing the horizontal guides 22 on which the work head 23 runs since the roller 40 is always vertically above the centre of gravity of the system comprising the work head 23 and any attachment 24. In fact as soon as the attachment 24 is applied it is possible, by working the screw 28 manually, or by means of drive transmitted through the reduction gearbox 29, to move the support member 26 so as to bring the roller 40 into a position vertically above the centre of gravity of the assembly comprising work head 23 and attachment 24. Finally, by having the intermediate member 42 separate from the slide 5, and by suspending the intermediate member 42 by means of the cables 43, the forces due to the movement of the work head 23 are prevented from transferring on to the guideways 4 upon which the slide 5 moves.

The cam 33 provides an original compensating link between the position which the roller 40 assumes on the work head 23 and the value of the forces acting upon the roller 40. It will be apparent that in order to fully relieve the guides 22 from the weight of the assembly of work head 23 and attachment 24 after an attachment 24 has been connected to the work head 23, thereby changing the total weight of the assembly and changing the position of the centre of gravity it is not enough to move the roller 40 until it is placed vertically above the new centre of gravity of the attachment-head assembly but it is necessary also to compensate for the increase of weight due to the addition of the attachment 24 by increasing the load acting upon the roller 40.

This increase of load is provided for by the upper surface 34 of the cam 33 which is so shaped to compensate the roller 40 for each position which the latter assumes upon the head 23. In practice the surface 34 is provided with indentations spaced along its length, each one corresponding to a particular one of the attachments with which the machine is provided.

Thus the machine tool is adapted to be adjusted so that for each attachment, the extent by which the centre of gravity of the work head 23 is shifted by the connection of each attachment 24 and the total weight of the assembly with each attachment 24 can be compensated. This is achieved by calculating the longitudinal position which the tracer point 35 has to assume in order that the roller 40 shall be directly over the centre of gravity and then determining the extension of the cables under the new weight of the assembly. This information enables the shape of the surface 34 of the cam 33 to be determined; a small indentation such as by punching is then made on the face 34 of the cam 33 to correspond to the position of the tracer point for the appropriate compensation to be achieved for any particular attachment 24.

When the work head 23 moves along the guides 22 of the slide 5, the roller 40 slides upon the track 41 on the intermediate member 42 which is free to move in a vertical plane and is supported in this plane by the cables 43. When the roller 40 moves toward one end of the intermediate member 42, the tension in each of the cables 43 varies, although the sum of the two tensions remains constant and equal to the load of the roller 40. Because the pulleys 15 are close together the moment due to the difference in tension of the two cables 44 is always relatively small and can be easily transferred from the carriage 11 on to the upright 3 via the guideways 10.

The hydraulic cylinder 17, being connected to the carriage 11 which in its turn is connected to the cables 6 and 43 is loaded by the sum of the tensions of the cables 6 and 43. This sum is constant and equal to a fraction of the weight of the slide 5, together with the weight of the head 23 and of any attachment 24 which is connected to the work head 23.

In view of the elasticity of the cables 43, the variation of their tensions when the work head 23 moves toward one end of the slide 5, causes a movement of the intermediate member 42 in a vertical plane. This movement may be considered as a vertical translation of the intermediate member 42 parallel to itself, and a rotation of the intermediate member 42 in the vertical plane.

The vertical translational movements of the intermediate member 42 do not influence the horizontality of the course of the head 23 very much since these are taken up by the hydraulic cylinder 17, the pressure of which can if necessary be varied, and by the springs 21 which are designed to keep the tension of the cables 6 constant. On the other hand the rotations of the intermediate member 42 do have an influence on the operation of the machine tool.

When the intermediate member 42 adopts a position inclined from the horizontal such as when the head 23 moves to one end of the slide 5, it induces a variation in the load of the roller 40 as a result of the variation in the compression of the spring 36 as the force acting on the tracer point 35 changes direction; from this there arises a defective balance of the head 23.

The incline of the cross-piece 42 is however compensated for by the special shape of the track 41. This, as has been said, has approximately the shape of a segment of a fourth order parabola. The precise shape is achieved by superimposing successive segments of a fourth order parabola each related to a particular attachment 24. In practice, once the number and the type of the attachments 24 which are to be connected to the work head 23 of an individual machine have been determined it is possible to calculate, for the unloaded head 23, and for each assembly made up of the head 23 and one of the attachments 24, the distortion curve of the cables 43 in dependence on the position of the head 23 upon the slide 5. In this way an aggregate of the appropriate parabolas of the fourth order can be obtained each displaced one from the other either in the horizontal or the vertical direction. Since the vertical movement of the intermdeiate member 42 does not affect the rectilinearity of the motion of the head 23 in that it is compensated for by the hydraulic actuator 17, it is possible to transpose the parabolas so derived to the same horizontal level. In this position the parabolas are all side by side and partially superimposed one on the other, consequently, by making use of successive segments of each parabola it is possible to construct a medial curve which represents the course of the track 41. Therefore, the roller 40 moving along the track 41 follows a substantially horizontal path since the difference between the elastic extension of the two cables 43 is compensated, at each stage, by the shape of the track 41. Consequently, during the movement of the head 23, since the head 23 moves along the horizontal guides 22 and the roller 40 runs a horizontal course (as described above) there is, therefore, no relative motion between the roller 40 and the head 23, and so the load on the roller 40 is constant during the movement of the head.

The hydraulic cylinders 46 which may be interposed between the ends of the cables 43 and the intermediate member 42 can be variously filled so as to compensate either for inelastic distortions of the cables 43, or else to correct the tension of the two cables 43 in accordance with any errors of inclination or of the path of the head 23. To this end a closed-circuit system may be provided to convert into pressure variations at the hydraulic cylinders 48, any errors of inclination of path determined by transducer (not shown in the illustrations) which may, for example, be electronic or photo electric transducers.

Naturally, the principle of the invention remaining the same, the details of construction of the machine can be widely varied from what has been illustrated and specified purely by way of non-restrictive example, without nevertheless going beyond the spirit and scope of this invention.

What we claim is:
1. A machine tool having a bed,
   an upstanding member extending above said bed, substantially vertical guideways on said upstanding member,
   a slide constrained to move along said guideways,
   first load transfer means on said upstanding member, said load transfer means supporting the weight of said slide,
   substantially horizontal guideways on said slide, a work head constrained to move along said substantially horizontal guideways, said work head supporting one of a range of attachments for said machine tool,
   an intermediate member, track means on said intermediate member, a roller supporting said work head and running along said track means on said intermediate member,
   second load transfer means on said upstanding member supporting said intermediate member, said track means on said intermediate member being shaped to compensate for the resilience of said second load transfer means whereby said work head is supported to move along a line which is substantially horizontal and rectilinear.

2. The machine tool of claim 1, wherein there is a support slidably mounted upon said work head, and connected to said roller, said support being adjustable to follow the position of the centre of gravity of the assembly comprising said work head and any of said attachments,
   adjusting means being provided for adjusting the force with which said roller presses upon said track in dependence on the relative position of said roller and said work head.

3. The machine tool of claim 2 wherein said adjusting means includes a cam on said work head, a tracer point, a resilient coupling, and a rocker arm cooperating with said resilient coupling, said rocker arm connecting said roller and a support, said force being variable in dependence on the position of said tracer point along the face of said cam, said cam having a plurality of discrete levels arranged at points along said face so that the weight of said assembly comprising said head and any said attachment is balanced when the centre of gravity of said assembly is disposed vertically below one of the said points.

4. The machine tool of claim 2 wherein there is a feeding screw on said work head, said feeding screw being designed to cooperate with said support of said roller to determine the longitudinal movement of said head, said screw being operated by a motion reducer.

5. The machine tool of claim 1 wherein said track means of said intermediate member upon which said roller runs has a course in the shape of a parabola of the fourth order selected from superimposed segments of fourth order parabolas, the first of which constitutes the distortion curve of said support of said intermediate member obtained in response to movement of said work head when unloaded, and the others each constituting the distortion curve of said support obtained in response to movement of said assembly comprising said work head and successively heavier said attachments from the range intended for the machine.

6. The machine tool of claim 1 wherein the weight of said slide and said work head is transferred to said upstanding member by means of a single balancing member.

7. The machine tool of claim 6, wherein there is a carriage connected to said balancing member which is slidably mounted upon vertical guideways on the far side of said upstanding member from the guideways of said slide, the carriage supporting one pair of pulleys spaced out from each other and a second pair of pulleys between said first pair and as close as possible to each other.

8. The machine tool of claim 6 wherein said support for said slide comprises two parallel cables connected at one end to the end of said slide and at the other end to a resilient member which is in turn connected to a cover over said upstanding member, each said cable passing over two said pulleys on the top of said upstanding member and passing below one of said pulleys of the first pair borne on said carriage.

9. The machine tool of claim 6 wherein said balancing member comprises a single mechanical counterweight.

10. The machine tool of claim 6 wherein said balancing member comprises a single hydraulic cylinder connected on one side to said carriage and on the other to said upstanding member.

11. The machine tool of claim 7 wherein said support for said intermediate member comprises two parallel cables connected at one end to the ends of said intermediate member and at the other end to said cover each said cable passing over two said pulleys on said upstanding member and passing below one of said pulleys of said second pair borne by said carriage.

12. The machine tool of claim 11 wherein each of said suspension cables of said intermediate member is connected directly to said intermediate member.

13. The machine tool of claim 11 wherein each of said cables of said intermediate member is connected to said intermediate member by means of hydraulic cylinders.

References Cited
UNITED STATES PATENTS 3,580,133    5/1971    Berthiez _____ 90—11 R GIL WEIDENFELD, Primary Examiner U.S. Cl. X.R.

90—11 R